United States Patent

Van Raalte et al.

[15] 3,637,308
[45] Jan. 25, 1972

[54] COLOR CORRECTION OF PRISMATIC OFF-AXIS OPTICAL SYSTEM

[72] Inventors: John A. Van Raalte, Princeton, N.J.; Walter Joseph Gorkiewicz, New York, N.Y.

[73] Assignee: RCA Corporation

[22] Filed: June 11, 1970

[21] Appl. No.: 45,311

[52] U.S. Cl. .................................353/69, 350/168, 350/182, 350/204, 353/81
[51] Int. Cl. .........................................G03b 21/14
[58] Field of Search ...............350/168, 182; 353/69, 70, 81, 353/33

[56] References Cited

UNITED STATES PATENTS

| 3,195,397 | 7/1965 | Clapp | 350/168 |
| 2,052,625 | 9/1936 | Harrison | 350/168 UX |
| 2,225,035 | 12/1940 | Cook | 353/81 X |
| 3,253,505 | 5/1966 | Miller | 353/70 |

FOREIGN PATENTS OR APPLICATIONS

| 162,656 | 5/1921 | Great Britain | 350/168 |

*Primary Examiner*—John K. Corbin
*Attorney*—Eugene M. Whitacre

[57] ABSTRACT

Unmodulated, collimated white light is angularly directed to a target reflecting surface which is deformable to represent a subject, and the subject-modulated light reflected from the target surface is directed to a viewing screen by a Schlieren optical system including a projection lens and a stop at the focal point of the lens. A first prism is located between the subject-bearing target surface and the lens to render the light reflected from the target surface orthogonal to the principal plane of the lens and the screen. A second prism is located between the lens and its focal point to effect a color correction of the subject-modulated light reflected from the target surface.

5 Claims, 5 Drawing Figures

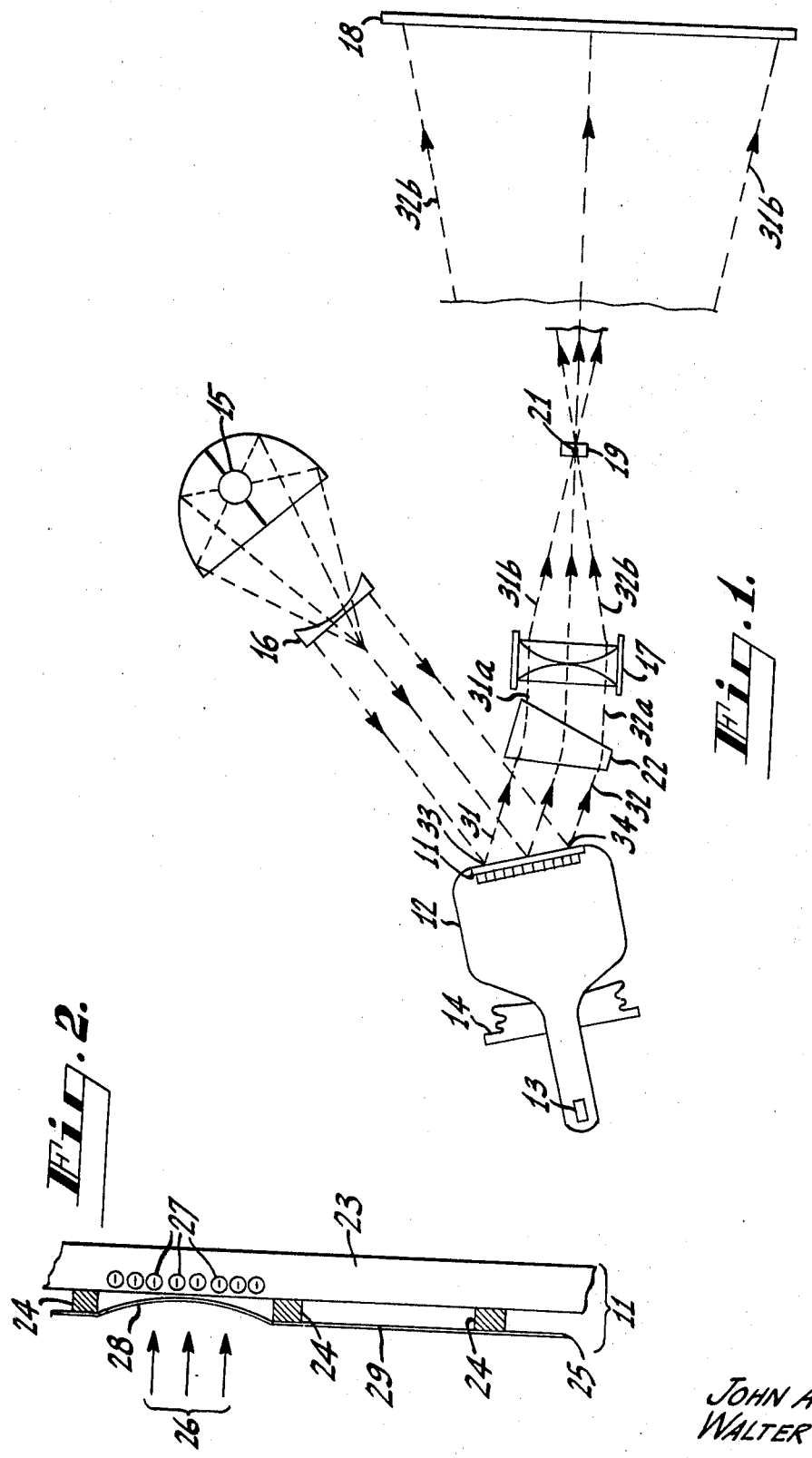

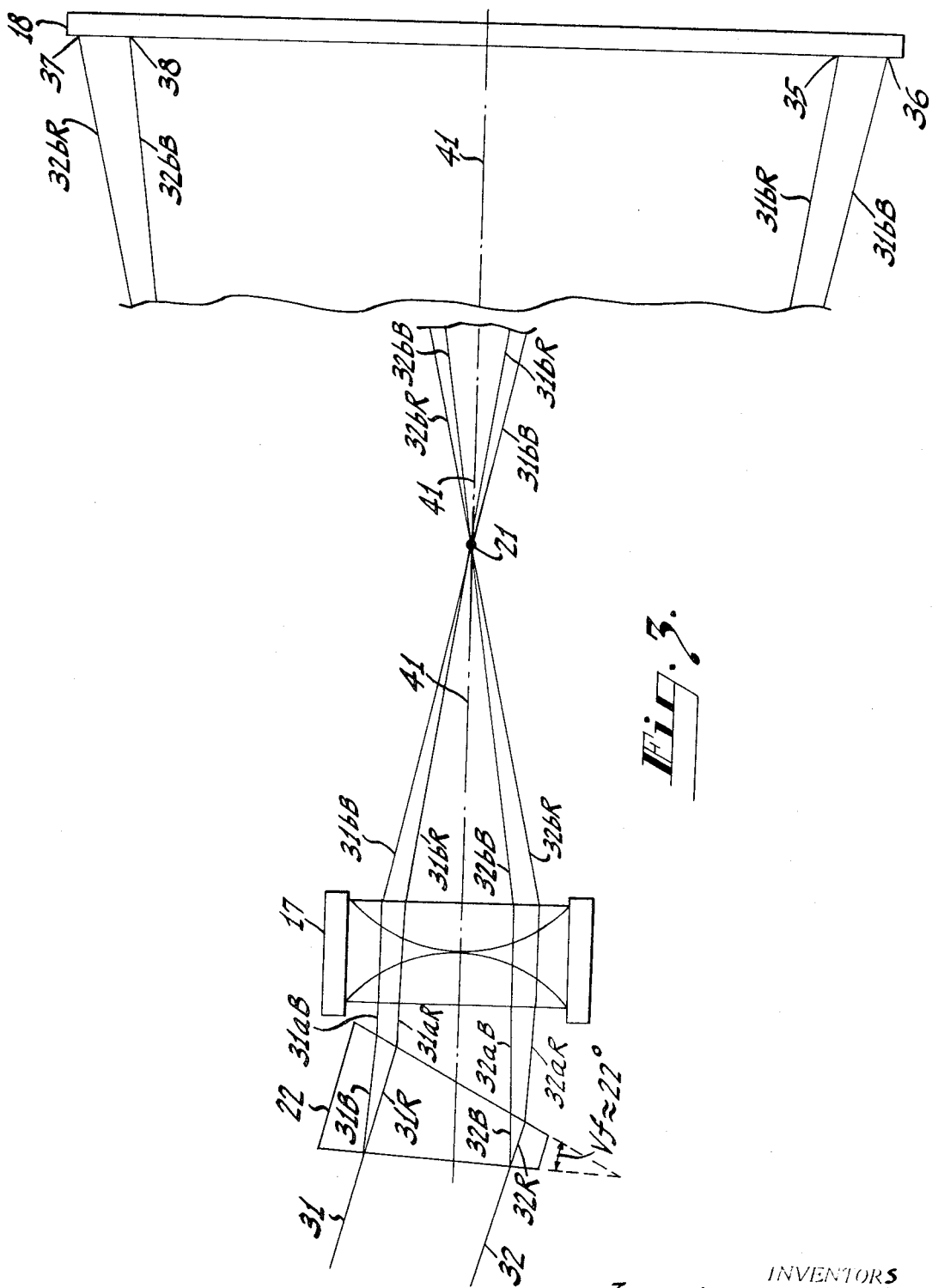

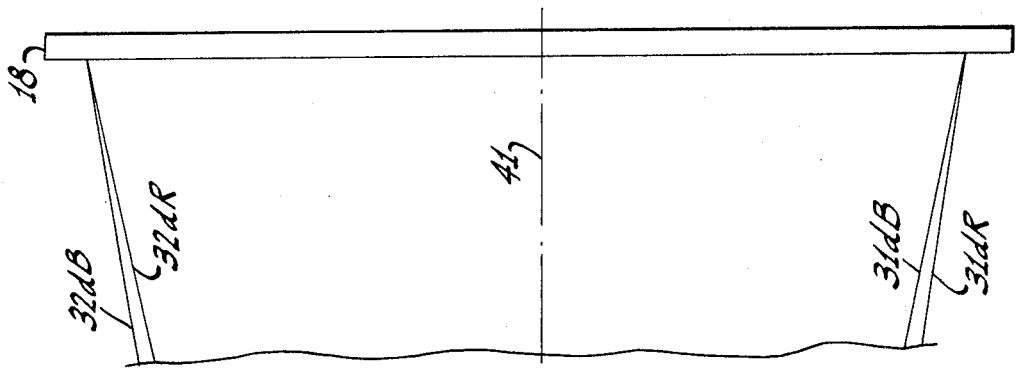
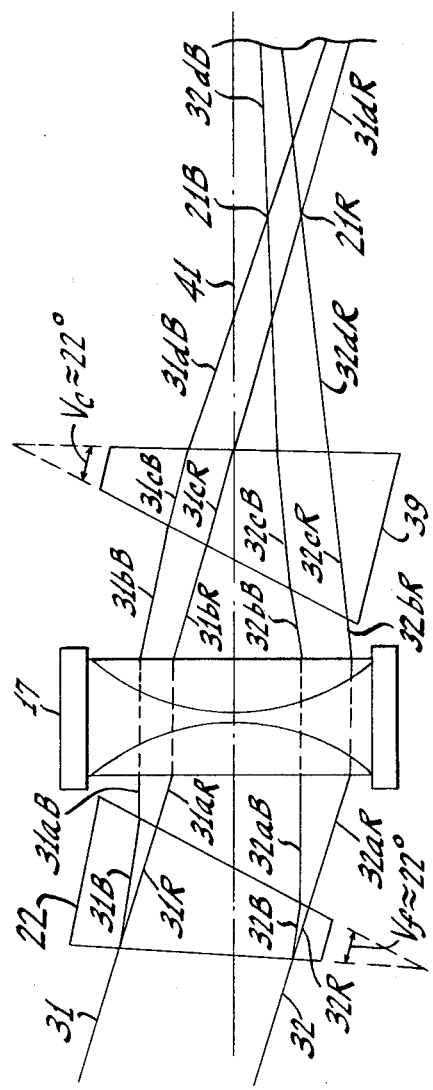
Fig. 4.
INVENTORS
JOHN A. VAN RAALTE &
WALTER J. GORKIEWICZ
BY William H. Meagher
Attorney

COLOR CORRECTION OF PRISMATIC OFF-AXIS OPTICAL SYSTEM

At present, bright television images are best produced by projecting onto a viewing screen light modulated by a light valve to represent a subject. One such light valve is a multifaceted light-reflecting film which is used in a schlieren type of optical projection system. In such a system either one of two general arrangements has been employed. In one arrangement a single lens has been used to perform (1) the function of collimating the light from a source which is directed onto the subject-bearing film which is deformed to a small degree and in different amounts to reflectively deviate the impinging light rays so as to represent the subject and (2) the function of projecting the reflected light toward the viewing screen. In such an arrangement, a stop is placed at the focal point of the lens so as to prevent any undeviated reflected light rays received from the subject-bearing film from reaching the screen. While, in this arrangement, the principal reflected light rays are substantially orthogonal to the principal plane of the lens and to the screen and the definition of the projected image is satisfactory, the contrast of the image tends to be undesirably reduced by unwanted light which is reflected toward the screen by the single lens serving both as collimator and as projector.

In the other previously used general arrangement, separate collimator and projector lenses have been employed. In this type of arrangement the collimated and projected light beams necessarily are at angles to the reflecting surface which is deformed to represent the subject. While such an arrangement can produce a projected image having relatively high contrast, it is one in which the image field undesirably deviates from orthogonality to the axis of the imaging light beam which produces a depth-of-field error. Such an error is manifested by an inability to project the image onto the screen with all parts of it in good focus. For example, such systems may be adjusted so that a central band of the projected image is in good focus on the viewing screen but the top and bottom portions of the image will be out of focus. Hence, the simultaneous requirements of satisfactory imaging of the light source on the schlieren stop and of producing good quality (i.e., low aberrations) of the image projected onto the viewing screen can only be satisfied for relatively small optical apertures and, consequently, the projected image will have an unsatisfactorily low brightness.

The use of relatively large optical apertures in a two-lens system causes a deviation from orthogonality of the reflected light rays on the screen which produces a keystone distortion of the image and a degrading variation of the resolution of the projected image. Heretofore, various measures have been adopted to mitigate to some degree one or both of such defects. One expedient was to predistort the dimensions of the image to be projected so as to compensate for the expected keystoning. Such an approach requires circuit modifications which not only add to the cost of the equipment but also produce other undesired image degradation. Another technique which has been employed is to effect the compensation by means of a fiber-optic combination prism. Such apparatus necessarily is quite complicated and cumbersome in addition to being costly. A third suggested compensation device is that disclosed in U.S. Pat. No. 3,249,004 issued May 3, 1966 to O. A. Ullrich which comprises two glass blocks located in the projected light path and serving to produce a rough depth-of-field compensation. Not only is the compensation afforded by such means too crude for the relatively high degree of resolution needed for the projection of good quality television images but also the unwanted lines, produced by the junction of one block with another, may appear in the image projected onto the viewing screen.

In a copending application of Edward G. Ramberg, Ser. No. 17,412, filed Mar. 9, 1970 and entitled "Optical System for Orthogonalizing Image Field of Projection Lens" the desired depth-of-field correction is achieved by the application of the general concept of placing a prism in the path of the light reflected from a subject. The particular application, employed by Ramberg, of such general concept is that of a prism placement adjacent the principal plane of the projecting lens so as to affect substantially only the subject-reflected light. For monochromatic illumination of the reflecting subject a simple, relatively inexpensive prism located near the projecting lens functions satisfactorily. For polychromatic, such as white, light subject illumination, however, Ramberg teaches that a prism located near the projecting lens needs to be one capable of correcting color errors. Such a prism is relatively complex and, hence, expensive.

It is an object of this invention to provide a prismatic off-axis optical projection system for effecting depth-of-field correction and in which color correction is achieved in a relatively simple and inexpensive manner.

The off-axis optical projection system embodying the present invention and following the broad teaching of Ramberg comprises means for angularly directing a beam of unmodulated, collimated white light onto a light-reflective surface on which is recorded a subject, an image of which is produced on a viewing screen by light-projecting means having its principal plane substantially parallel to the screen and which receives subject-modulated light angularly reflected from the subject-bearing surface. The projection system also includes a first prism located between the subject and the light-projecting means and which has such configuration, refractive index and orientation relative to the subject as to substantially orthogonalize the subject-modulated light relative to the principal plane of the light-projecting means, but which tends to produce color dispersions in the image projected onto the screen. The projection system further includes a second prism which is located between the light-projecting means and its focal point and has such configuration, refractive index and orientation relative to the light-projecting means as to substantially cancel the color dispersions in the image projected onto the screen.

For illustrative purposes the invention, while not necessarily limited thereto, is embodied in a schlieren type of projection system in which the collimated white light is directed by means including a collimating lens to a reflecting surface on which the subject is recorded as deformations of the surface. The subject-modulated light reflected from the deformable surface is directed by a projection lens toward the viewing screen and the depth-of-field correcting orthogonalizing prism is mounted adjacent the subject-facing side of the projection lens. In one embodiment the color correcting prism is mounted adjacent the screen-facing side of the projection lens, and in another embodiment the color correcting prism is mounted in the vicinity of the focal point of the projection lens.

For a more specific disclosure of the invention and its mode of operation reference may be had to the following detailed description of two illustrative embodiments thereof which is given in conjunction with the accompanying drawings, of which:

FIG. 1 is a diagrammatic representation of one type of image projection system in which the apparatus of the invention may be used;

FIG. 2 is a fragmentary view, to a grossly enlarged scale, of an electrode of the system of FIG. 1 on which the subject whose image is to be projected may be recorded;

FIG. 3 is a diagrammatic representation, to an enlarged sale, of the operation of the system of FIG. 1, showing the color dispersion produced in the projected image by a noncolor-corrected orthogonalizing prism;

Figure 5:
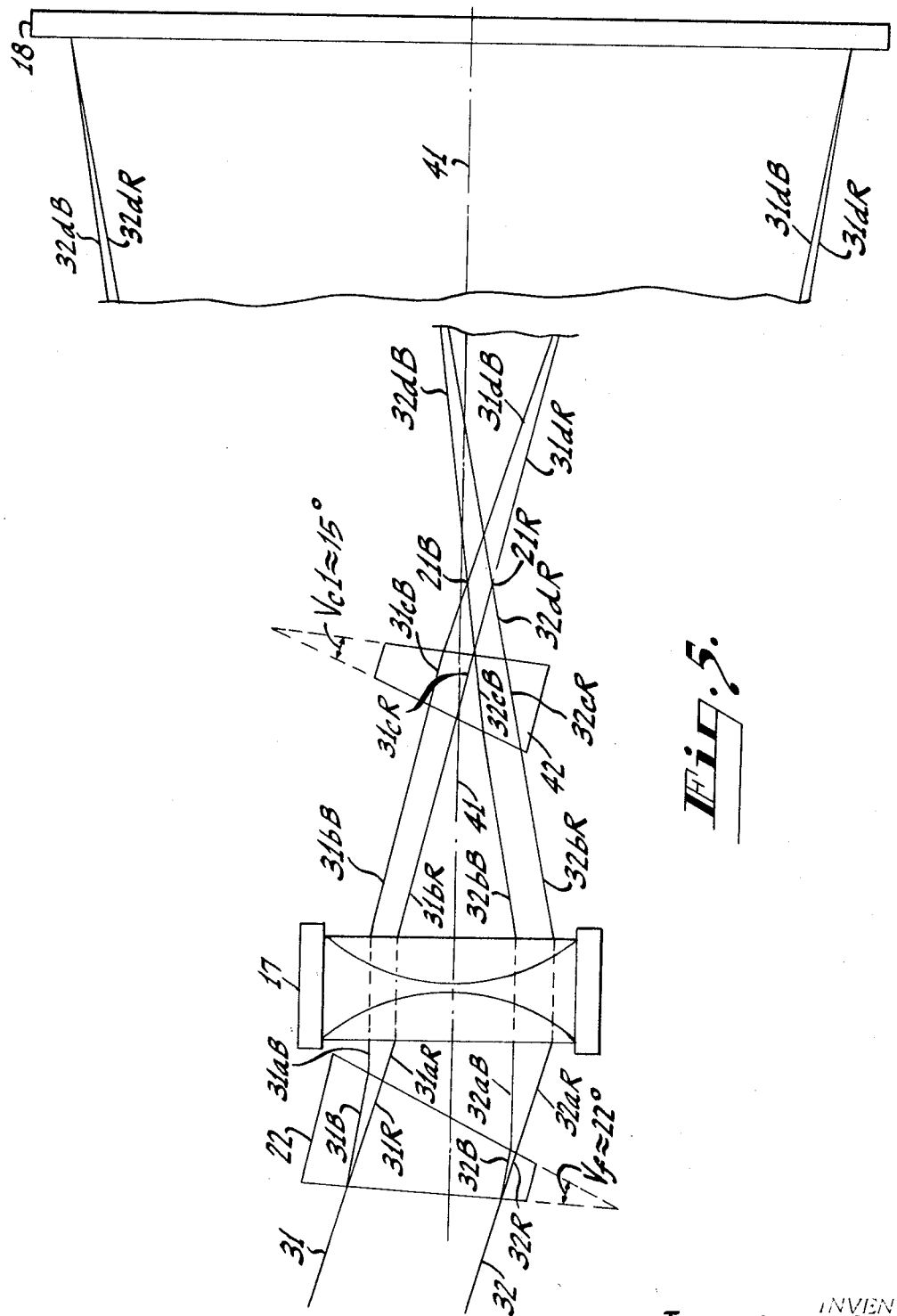

FIG. 4 is a diagrammatic representation, to an enlarged scale, of the operation of one embodiment of the invention having a color-correcting prism mounted adjacent the screen-facing side of the projection lens; and FIG. 5 is a diagrammatic representation, to an enlarged scale, of the operation of another embodiment of the invention having a color-correcting prism mounted in the vicinity of the focal point of the projection lens.

FIG. 1 shows a general type of image formation and projection system in which the invention may be used. In this case the subject, representing the image to be projected, is formed on a light-reflecting target electrode 11 of a cathode-ray tube 12 by a video signal-modulated electron beam produced by a gun 13 and deflected over the target electrode by means including a deflection yoke 14 energized in a conventional manner to scan a raster at the electrode 11. White light from a source 15 is directed by means including a collimating lens 16 at an angle to the surface of the target electrode 11 from which it is reflected in image-representative form and directed by means including a projecting lens 17 to a viewing screen 18. The particular image-projecting system shown to illustrate the invention is of the schlieren type which has a stop 19 located substantially at the focal point 21 of the projecting lens 17. A depth-of-field correcting orthogonalizing prism 22 is mounted adjacent the subject-facing side of the projecting lens 17 is taught in the copending Ramberg application to which reference has previously been made. Unlike the compound color-corrected prism of Ramberg, however, the prism 22 may be made of simple, easily obtained and relatively inexpensive materials such as lucite, ordinary crown glass and the like having an index of refraction of approximately 1.5. Even though such materials have relatively high color dispersion constants, which tend to produce color errors in the projected image, the present invention enables their use as will be subsequently disclosed.

The target electrode 11 of the cathode-ray tube 12 is effectively a part of a light valve of the type disclosed in a copending application of John A. van Raalte and Victor Christiano, Ser. No. 861,592, filed Sept. 29, 1969 and entitled "Intelligence-Handling Device Having Means for Limiting Induced Electrostatic Potential." Essentially, as shown in FIG. 2, the target electrode 11 comprises an insulating substrate 23, such as glass (which conveniently may be the faceplate of the cathode-ray tube 12) on one plane surface of which there is a plurality of supporting conductors 24 which are electrically connected together (not shown). The spacing between adjacent conductors corresponds to the dimensions of an elemental area of the subject to be effectively recorded on the electrode. The conductors 24 support, in spaced relation to the substrate 23, a light-reflective, electrostatically-deformable, normally flat metal film 25 which may be made of alloys of metals such as nickel, copper or aluminum, for example. The film 25 is sufficiently thin to be pervious to an electron beam 26 so that a pattern of electrical charges 27 may be produced on the insulating substrate 23, the particular pattern being determined by the intensity of the video signal modulation of the electron beam. The electrostatic potential so produced between the film 25 and the substrate 23 effects a local deformation of an elemental area 28 of the film 25. An elemental area 29 of the film 25 behind which no electrical charges are produced on the insulating substrate 23 remains flat and undeformed.

Again referring to FIG. 1, any light which is reflected from an undeformed elemental area of the metal film 25 of the target electrode 11 of the cathode-ray tube 12 is intercepted by the schlieren stop 19 and, hence, does not reach the screen 18, thereby producing a dark spot at that part of the projected image corresponding in location to that of the undeformed part of the target electrode film. At least some of the light which is reflected from a deformed area of the target electrode film, however, is not intercepted by the stop 19 and, hence, does reach the screen 18 to produce light of an intensity depending upon the amount of film deformation at the part of the projected image which corresponds to the location of the deformed area of the film in the recorded subject. The more intense the electron beam is at a given elemental area of the film the greater will be the film deformation and the greater amount of the light from the source 15 that will be reflected to the screen 18. In this way a reproduction of the subject recorded at the target electrode 11 of the cathode-ray tube 12 is projected onto the viewing screen 18. As previously stated, however, such a reproduction will be subject to such deficiencies as unsatisfactorily low brightness, keystone distortion and the like unless steps, such as the use of the prism 22 taught in the copending referenced Ramberg application, are taken to compensate for the nonorthogonality of the reflected light rays relative to the principal plane of the projecting lens 17.

As taught by Ramberg, typical light rays 31 and 32 reflected respectively from points 33 and 34 of the target electrode 11 of FIG. 1 are passed through the depth-of-field correcting prism 22 from which they emerge as rays 31a and 32a respectively. The prism 22 has such configuration, refractive index and orientation relative to the target electrode 11 of the cathode-ray tube 72 that the emerging light rays 31a and 32a are substantially orthogonal to the projection lens 17 by which they are projected as rays 31b and 32b onto the viewing screen 18. If the rays 31 and 32 were monochromatic a simple prism 22 of ordinary crown glass would suffice to enable the projection of a satisfactory image onto the screen 18. But, where the rays 31 and 32 are of white light, so as to effect the projection of a black and white image onto the screen 18, such a simple prism 22 placed adjacent the lens 17 produces such color dispersion of the white light rays as to render the image projected onto the screen unsatisfactory for viewing. Ramberg, hence, teaches the use of a color-corrected prism in order to avoid such a difficulty.

FIG. 3 illustrates the manner in which a simple prism 22 produces such undesired color dispersion of the typical reflected white light rays 31 and 32 as to adversely affect the image projected onto the screen 18. In the following descriptions of FIGS. 3, 4 and 5, the red and blue components of these typical white light rays will be considered as representing opposite ends of the visible white light spectrum. Because the refraction by the prism 22 is less for red light than it is for blue light the white light ray 31 reflected from a point 33 of the target electrode 11 of FIG. 1 is dispersed into its constituent color components including the red and blue components 31R and 31B. It will be understood that these two ray components are representative of the maximum dispersion to be experienced in practice. Constituent color components of the rays 31 and 32 having wavelengths longer than the blue component 31B but shorter than the red component 31R lie between the extremes of color dispersion represented by the ray components 31R and 31B in passing through the prism 22. The diverging red and blue ray components 31R and 31B emerge from the prism 22 as red and blue ray components 31aR and 31aB, respectively, which are projected toward the screen 18 by the lens 17 as red and blue ray components 31bR and 31bB respectively. These ray components impinge upon the screen at mutually spaced points 35 and 36. Similarly, the white light ray 32 emerges from the prism 22 as diverging red and blue ray components 32aR and 32aB, respectively, and are projected by the lens 17 as red and blue ray components 32bR and 32bB, respectively, to impinge upon the screen at mutually spaced points 37 and 38, thereby spreading the images of the points 33 and 34 of the target electrode 11 of FIG. 1 over areas represented by the separation of the points 35–36 and 37–38 respectively. Thus, the resolution of the screen image is undesirably degraded.

In the illustrative embodiment of the invention diagrammatically represented in FIG. 4, the same simple prism 22 as that shown in FIG. 3 is used for depth-of-field correction. Such a prism may be made of ordinary crown glass and the like having an index of refraction of approximately 1.5 and a vertex angle $V_f$ approximately equal to 22°. It is mounted adjacent the subject-facing side of the projection lens 17 and is oriented relative to the target electrode 11 of FIG. 1 and to the lens 17 such that green ray components, for example, having a wavelength substantially midway between the wavelengths of the red and blue ray components, emerge from the prism 22 substantially orthogonal to the projection lens. A second color-correcting prism 39 of the same material and configuration of the prism 22 is mounted adjacent the screen-facing side of the projection lens 17. The prism 39, however, is oriented oppositely to the first prism 22 with its vertex angle Vc on the other side of the optical axis 41 of the lens 17 from the vertex angle Vf of depth-of-field correcting prism 22. The dispersed ray components 31bR and 31bB, which emerge from the lens 17, traverse the prism 39 as red and blue ray components 31cR and 31cB, respectively, which emerge from the prism as red and blue ray components 31dR and 31dB, respectively, which substantially converge to a single point of the screen 18, thereby effecting the production of an image with adequate resolution.

Similarly, the ray components 32bR and 32bB emerging from the lens 17 are substantially converged on the screen 18 after their passage through the prism 39, as red and blue components 32dR and 32dB respectively.

The illustrative embodiment of the invention shown in FIG. 5 is similar to that of FIG. 4 except that the color-correcting prism 42 is located in the vicinity of the focal point 21 of the projection lens 17. It was found that, not only could the prism be smaller by reason of such a location, but also its vertex angle Vcl could be made as small as approximately 15f when a depth-of-field correcting prism 22 is used. Again, as in the embodiment of FIG. 4, both prisms are of the same simple, readily available material such as ordinary crown glass or plastic equivalent having an index of refraction of approximately 1.5. The operation of the system of FIG. 5 is similar to that of FIG. 4 with the ray components 31bR–31bB and 31bR–31bB traversing the prism 42, respectively, as ray components 31cR–31B and 32cR–32cB which converge on the screen 18, after leaving the prism 42 as ray components 31dR–31dB and 32dR–32B respectively.

The foregoing description of two illustrative embodiments of the invention and their modes of operation sets forth the nature of the invention, the scope of which is defined by the following claims.

What is claimed is:

1. An optical system for projecting an image of a light-reflective subject onto a viewing screen, comprising:
    means for directing a beam of unmodulated, collimated white light angularly onto said subject;
    light-projecting means having its principal plane substantially parallel to the plane of said screen for receiving subject-modulated light angularly reflected from said subject and directing it toward said screen;
    a first prism located between said subject and said light-projecting means and having such configuration, refractive index and orientation relative to said subject as to substantially orthogonalize said subject-modulated light relative to the principal plane of said light-projecting means, but tending to produce color dispersions in the image projected onto said screen; and
    a second prism located between said light-projecting means and its focal point and having such configuration, refractive index and orientation relative to said light-projecting means as to substantially cancel said color dispersions in the image projected onto said screen.

2. An optical system as defined in claim 1, wherein:
    said first and second prisms are substantially identical in configuration and refractive index, and each comprise a single element prism of a material having a relatively high color dispersion constant.

3. An optical system as defined in claim 2, wherein:
    said first and second prisms have substantially the same apex angle between their respective light-entrance and light-exit sides and are located respectively adjacent opposite sides of said light-projecting means with their respective apex angles on opposite sides of the axis of said light-projecting means.

4. An optical system as defined in claim 1, wherein:
    said first and second prisms are different in configuration and in their respective locations relative to said light-projecting means, and each comprise a single element prism of a material having a relatively high color dispersion constant.

5. An optical system for projecting an image of a light-reflective subject onto a viewing screen, comprising:
    means for directing a beam of unmodulated, collimated white light angularly onto said subject;
    light-projecting means having its principal plane substantially parallel to the plane of said screen for receiving subject-modulated light angularly reflected from said subject and directing it toward said screen;
    a first prism located between said subject and said light-projecting means and having such configuration, refractive index and orientation relative to said subject as to substantially orthogonalize said subject-modulated light relative to the principal plane of said light-projecting means, but tending to produce color dispersions in the image projected onto said screen; and
    a second prism located between said light-projecting means and its focal point and having such configuration, refractive index and orientation relative to said light-projecting means as to substantially cancel said color dispersions in the image projected onto said screen;
    said first and second prisms being different in configuration and in their respective locations relative to said light-projecting means;
    said second prism having a smaller apex angle between its light-entrance and light-exit sides and a smaller overall dimension than the apex angle between the light-entrance and light-exit sides of said first prism and its overall dimension, respectively;
    said first prism being located adjacent the subject-facing side of said light-projecting means with its apex angle on one side of the axis of said light-projecting means; and
    said second prism being located remote from the screen-facing side of said light-projecting means in the vicinity of said focal point with its apex angle on the other side of the axis of said light-projecting means.

* * * * *